United States Patent
Weikart et al.

(10) Patent No.: US 6,212,535 B1
(45) Date of Patent: Apr. 3, 2001

(54) BROWSER-BASED ELECTRONIC MESSAGING

(75) Inventors: Christopher M. Weikart; William D. Goldenthal, both of Cambridge, MA (US); Debajit Ghosh, Exton, PA (US); Kenneth F. Alden, Boylston; Brian S. Eberman, Somerville, both of MA (US)

(73) Assignee: Digital Equipment Corporation, Maynard, MA (US)

( * ) Notice: Subject to any disclaimer, the term of this patent is extended or adjusted under 35 U.S.C. 154(b) by 0 days.

(21) Appl. No.: 08/710,696

(22) Filed: Sep. 19, 1996

(51) Int. Cl.[7] .............................. G06F 17/00; G06F 15/16
(52) U.S. Cl. ........................................ 707/513; 709/206
(58) Field of Search ..................................... 707/513, 516, 707/530; 395/200.48, 200.33, 200.8; 345/302, 329–335, 300; 455/5.1, 500, 51; 379/93.24, 100.08; 370/349, 389, 471

(56) References Cited

U.S. PATENT DOCUMENTS

| | | | |
|---|---|---|---|
| 5,191,410 | * | 3/1993 | McCalley et al. ................. 358/86 |
| 5,210,825 | * | 5/1993 | Kavaler ............................. 395/147 |
| 5,355,472 | * | 10/1994 | Lewis ................................ 395/600 |
| 5,381,466 | * | 1/1995 | Shibayama et al. ............... 379/88 |
| 5,455,948 | * | 10/1995 | Poole et al. ...................... 395/650 |
| 5,459,826 | * | 10/1995 | Archibald ......................... 395/147 |
| 5,493,692 | * | 2/1996 | Theimer et al. .................. 455/26.1 |
| 5,495,565 | * | 2/1996 | Millard et al. ................... 395/147 |
| 5,513,126 | * | 4/1996 | Harkins et al. ................... 364/514 |
| 5,530,852 | * | 6/1996 | Meske, Jr. et al. ............... 395/600 |
| 5,572,643 | * | 11/1996 | Judson .............................. 395/793 |
| 5,678,041 | * | 10/1997 | Baker et al. ...................... 395/609 |
| 5,790,793 | * | 8/1998 | Higley .......................... 395/200.48 |
| 5,835,712 | * | 11/1998 | DuFresne ...................... 395/200.33 |

FOREIGN PATENT DOCUMENTS 10-63590 * 3/1998 (JP).

OTHER PUBLICATIONS

Translation of Abstract of the Disclosure for Japanese Patent No. 10–63590*
Translation of portions of the Official Letter of December 22, 1999 regarding Japanese Patent No. 10–63590*

* cited by examiner

*Primary Examiner*—Joseph H. Feild
*Assistant Examiner*—Alford W. Kindred
(74) *Attorney, Agent, or Firm*—Cesari & McKenna, LLP (57) ABSTRACT

In a computerized method for messaging, a Web page includes an embedded tag specifying a message extension program. The Web page is requested from a Web server by a Web browser of a first client computer connected to the Web server computer by a communications network. The extension program corresponding to the message tag is retrieved. A multimedia message is recorded as digital signals in a file of the client computer using the extension program. The file is sent to a second client computer as an electronic mail message.

21 Claims, 8 Drawing Sheets

BROWSER-BASED ELECTRONIC MESSAGING

FIELD OF THE INVENTION

The present invention relates generally to electronic messaging, and more particularly to messaging using the Internet.

BACKGROUND OF THE INVENTION

Recently, a number of products have become available for sending and receiving voice messages using the Internet Protocol (IP). For example, Internet telephone software applications implement real-time synchronous two-way voice communications between users using Internet TCP/IP protocols. As a restriction, the users at both ends of the communications link need a suitably equipped PC including the same proprietary software. As with standard telephone communications, the person for whom the message is intended must be available to answer the call at the time the call is placed, otherwise two-way communications cannot take place.

Some electronic mail products can asynchronously send non-textual information, e.g., voice messages, via the Internet. For example, the voice message is first recorded in a file using a specialized application program. Then, the file is converted to a corresponding Multipurpose Internet Mail Extension (MIME) format. The voice message can be forwarded to the intended recipient by attaching the MIME encoded file to an outgoing message using some MIME enabled e-mail application program.

Voice messages have also become a standard feature of many World-Wide-Web (WWW or Web) pages. Typically, an Internet user locates a Web page using a Web browsing application such as Netscape Navigator, or Microsoft Internet Explorer. Once a page has been selected, audio content associated with the page can be displayed by the browser after the page is delivered. In most cases, the audio message is a predetermined and embedded part of the Web page with no specific recipient indicated.

The audio content can be delivered to the browsers in a number of ways, ranging from simple audio (.wav) file transfer to proprietary streaming technologies, such as in RealAudio. The transfer is one way, from content provider, e.g., the web server, to the client browser.

It is desired to provide for the creation of multimedia content from within a Web browser, using a browser extension specified by a Web page, and its subsequent delivery to a remote destination. Furthermore, it is desired that the delivery mechanism be based on standard, non-proprietary, Internet protocols, such that the intended recipient may receive and process such a message using any e-mail client program that supports these protocols.

SUMMARY OF THE INVENTION

In a computerized method for sending multimedia messages, a Web page includes a tag specifying a browser extension program, and a location of the extension program. The Web page is accessible by a Web server computer. The Web page is requested by a Web browser of a first client computer connected to the Web server computer by a communications network. The extension program is retrieved from the location specified in the tag of the Web page, and extends the Web browser.

Subsequently, the extension program is executed to record a multimedia message as digital signals in a file of the client computer. The file can be sent to a second client computer as an encoded electronic mail message.

In one aspect of the invention, an audio message is recorded using a microphone and a sound card, and in another aspect, the message is recorded using a camera and a video card.

DETAILED DESCRIPTION OF PREFERRED EMBODIMENTS

Figure 1:
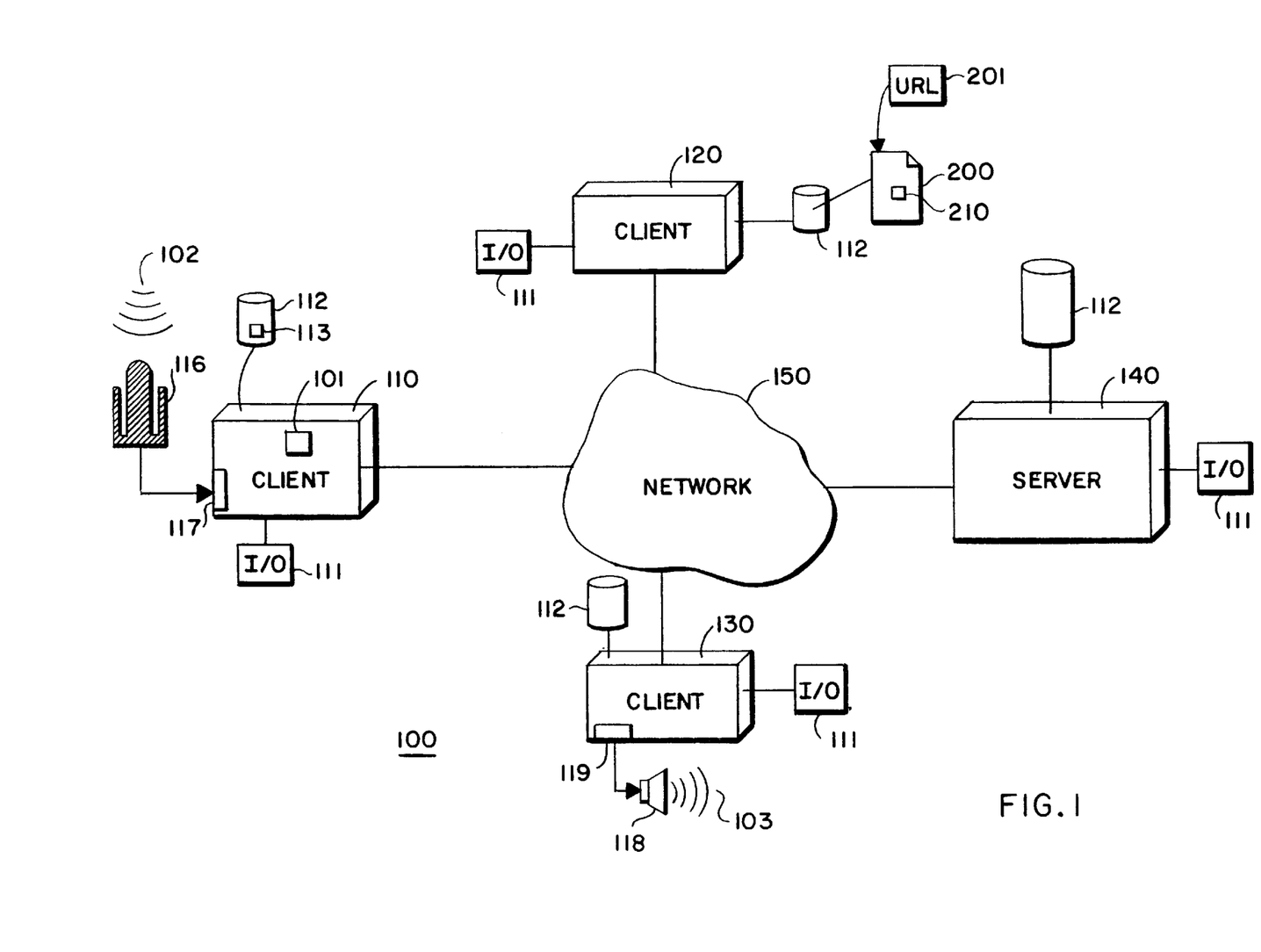
FIG. 1 is a block diagram of an electronic messaging system according to the invention.

FIG. 1 shows a messaging system 100 according to the invention. The system 100 includes client computers 110, 120, and 130, and a server computer 140 connected to each other by a communications network 150.

The client computers 110, 120, and 130 can be portable computers, e.g., lap-tops, PCs, workstations, or larger computer systems. The server computer 140 is usually configured as a workstation, or larger computer. The computers are standardly configured with dynamic random access memories (DRAM) connected to one or more processors via a bus. The computers can include input/output devices (I/O) 111 such as a mouse, keyboard, display terminal, printer, and network interface. The systems can also include local storage such as floppies and hard disk drives 112 for persistently storing programs and data. Application programs can execute under the control of system software such as Microsoft Windows 95, or NT O/S. Programs and data can also be loaded into the computers via the network 150.

The client computer 110 includes a microphone 116 connected to a soundboard 117. The soundboard 117 can convert analog acoustic signals 102 to digital signals. The client computer 120 includes application programs for generating World-Wide-Web (WWW) pages, e.g., page 200, described in further detail below. The client computer 130 includes a standard MIME enabled electronic mail (e-mail) application, for example Microsoft Exchange. The client 130 also includes a speaker 118 connected to a soundboard 119. The soundboard 119 can convert digital signals to analog acoustic signals 103. The server 140 includes Web server software for delivering Web pages, such as page 200, to requesting client computers. In the preferred embodiment, the network 150 uses Internet TCP/IP communications protocols at the logical levels.

During operation of the system 100, a user of the client computer 110 activates a browser application program 101 using, for example, the mouse. The browser 101 can be stored on the disk 112 of the client 110. For example, the browser 101 can be the Netscape Navigator, or the Microsoft Internet Explorer. The browser 101 is used for locating and requesting Web pages, such as page 200. The Web page 200 is identified by its unique addresses known as Universal Resource Locators (URL) 201, for example, "www.digital.com/user/my-home-page.html."

The user of the client computer 120 can create the page 200 using the HyperText Markup Language (HTML). The page 200 can be posted on the server 140 for general access by any of the users of the network 150. Alternatively, the page 200 can be stored on the disk 112 of the client computer 120 in a directory which is known to the server 140 as a repository of Web pages.

The server 140 executes "httpd" web server software to deliver Web pages to client computers using the HyperText Transport Protocol (HTTP). For example, using the browser 101, the user of the client 110 can access the page 200 by specifying the URL 201 of the page 200 in a request messages such as "www.digital.com/user/my-home-page.html."In response, the server 140 delivers the page 200 to the client 110. Once the page 200 arrives at the client 110, it can be stored locally on the disk 112, and/or viewed on an a display terminal using the browser 101.

Figure 2:
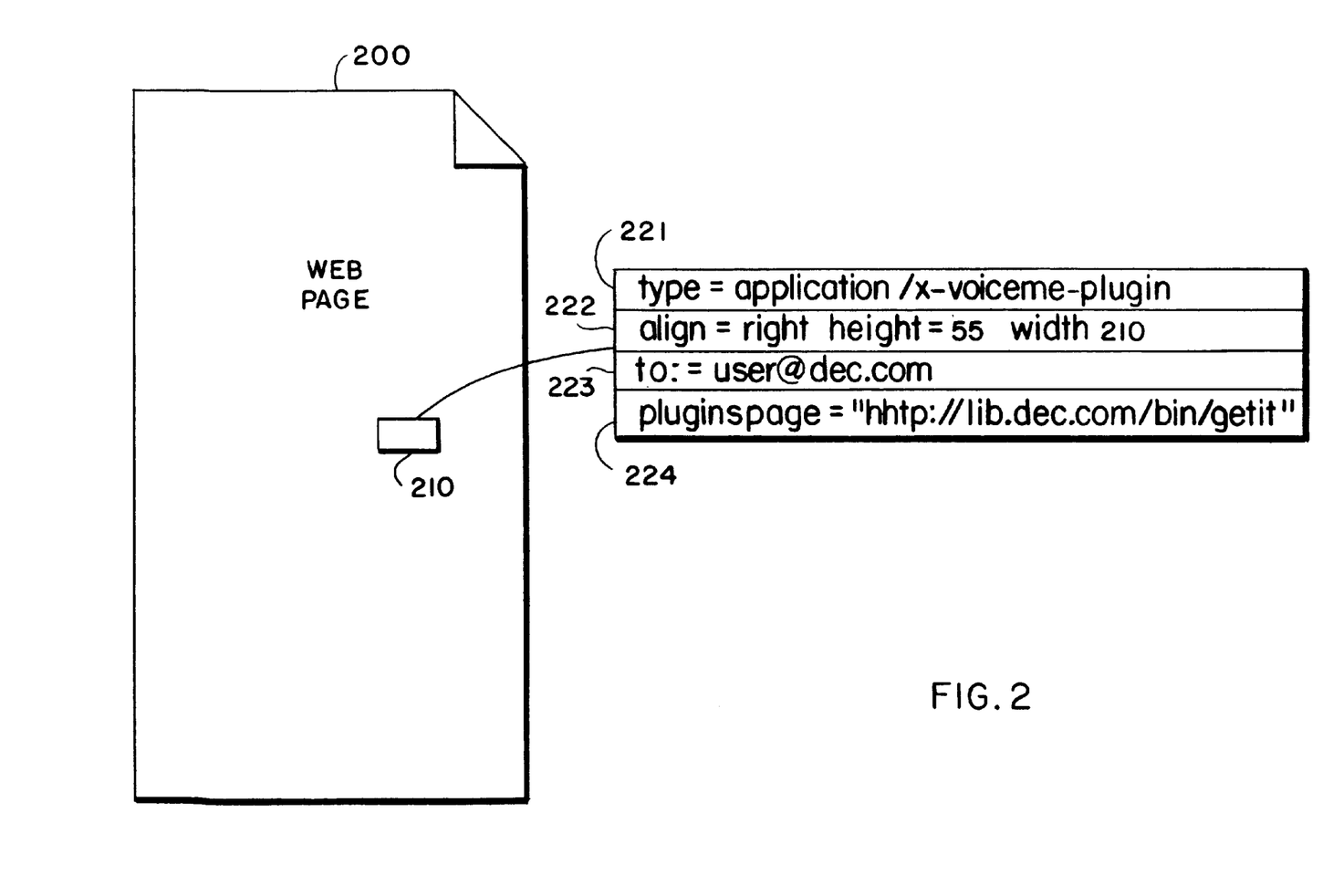
FIG. 2 is a block diagram of a Web page including an embedded tag specifying a messaging plug-in browser extension program.

The web page 200 includes an embedded HTML tag 210. The tag 210 specifies parameters for a "browser extension." A browser extension is a program which extends the capabilities of the browser application program 101. The specified extension can dynamically be retrieved by the client computer 110 via the network 150 and stored in the memory of the client. The extension is executed from within the application environment of the browser. However, the extension cannot run as stand-alone application software.

In the preferred embodiment of the invention, the extension can be a "plug-in," or an "applet." A plug-in extension is a hardware/software platform-specific program written in native executable code. A plug-in can essentially do anything the browser can do. A plug-in is loaded and permanently installed in the client 110. An applet extension is a platform-independent program written in JAVA code, and interpreted by the JAVA virtual machine (JVM). Security features limit the capabilities of the applet browser extension. The code of the applet is temporarily loaded along with the page 200. The code of the JAVA applet is discarded with the page.

FIG. 2 generally shows the form of a tag 210 specifying a browser extension in the form of a plug-in. Here, as shown in FIG. 2, the tag 210 of the page 200 includes field 221–224. The field 221 specifies a MIME "type" of the plug-in. In this case, the standard type is "application", and an "extra" (x) user defined sub-type is "x-voiceme-plugin." The field 222 specifies the alignment and dimensions of the display "window" within which the graphic user interface (GUI) of the extension is to operate. The field 223 specifies a default e-mail address which is to receive messages generated by the extension. The field 224 specifies the location where the extension is stored.

If the MIME type is not known to the internal table of the browser 101, then the user of the browser can retrieve the extension from the location specified in field 224, and install the extension in the browser 101. The location can be any computer accessible via the network 150.

The HTML code for a comparable tag specifying an applet extension may be specified, in part, as the code in Table 1.

TABLE 1

<title>Voiceme Applet </title>
<h1>VoicemeApplet 1<h1>
<applet code = "VoicemeApplet.class" width = 210 height = 200>
<a href = "VoicemeApplet.java">VoiceMe!</a>

Figure 3:
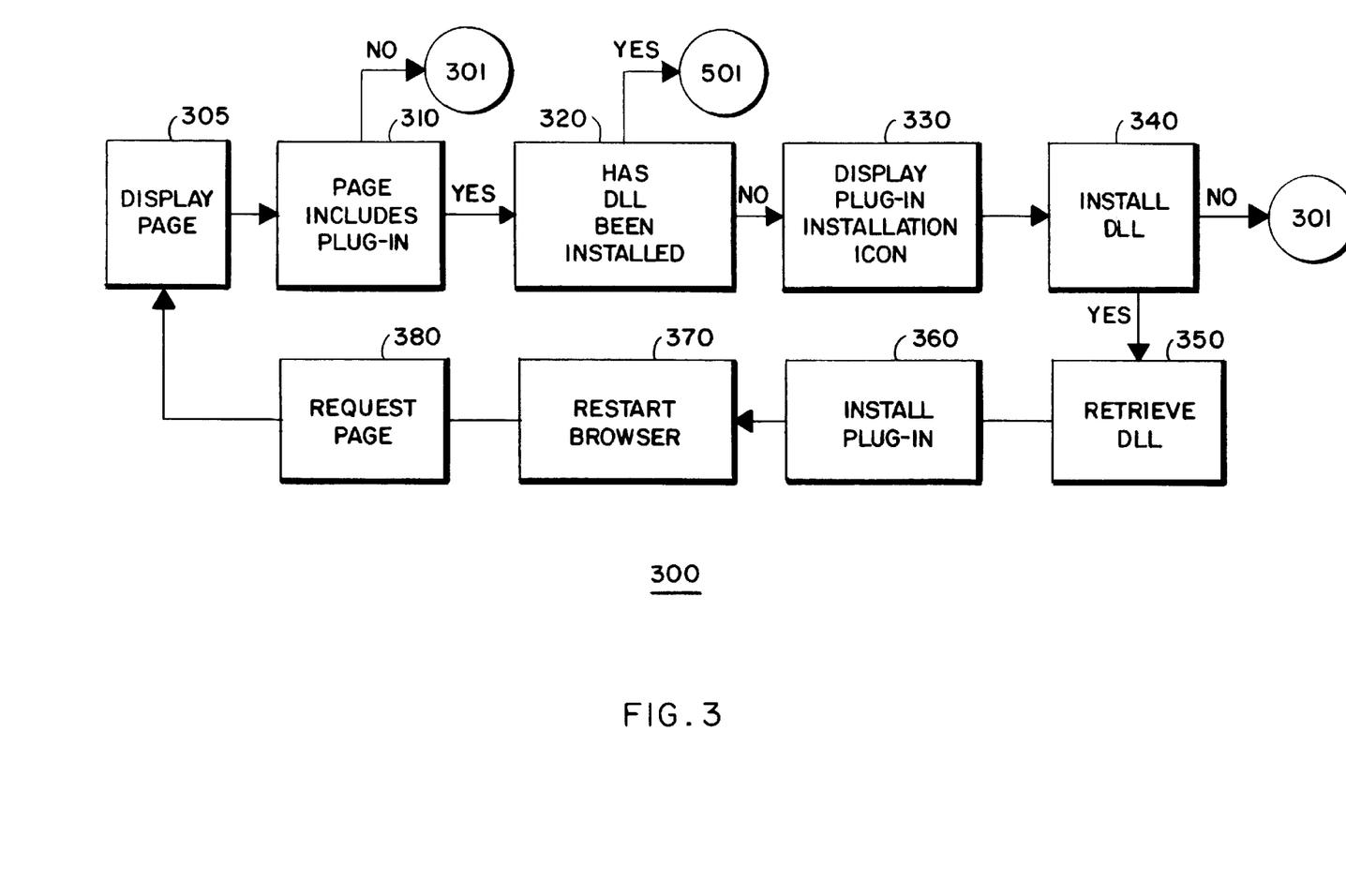
FIG. 3 is a flow diagram of a process to install a message extension program in a browser application program.

FIG. 3 generally shows the processing of the browser 101 with respect to extensions. In step 305, the page 200 is displayed. In step 310, the browser makes a determination if the page 200 includes a tag specifying an extension, step 310. If a page does not include an extension tag, then the browser waits for the next user command, step 301.

Otherwise, in step 320, the browser 101 makes a determination if the browser extension is an applet or plug-in. In the case of an applet, the extension can be fetched and executed immediately. In the case of a plug-in, a check is made to see if the extension (e.g., the dynamic link library (DLL) corresponding to the type 221 has already been installed by consulting its internal table. If the extension has been installed, then continue with step 510 of FIG. 5.

If the extension has not been installed, then a plug-in installation icon is displayed in step 330. This is a signal to the user that the MIME type required to process the page 200 is not recognized. In step 340, it is determined if the user requests installation of the extension, or not. If the user does not request installation, the browser 101 continues as for step 301.

Otherwise, in step 350, the extension is retrieved from the location specified in field 224 of the tag 210, and the DLL for the extension is installed in step 360. The user must exit and restart the browser 101 in step 370 so that the requisite MIME type, e.g., "application/x-voice-plugin" is recognized. In step 380, the page is requested again, so the process can now proceed with step 501 of FIG. 5.

As stated above, it should be noted, in the case of an applet extension, the applet is automatically downloaded into the client computer 110. The applet extension is discarded with the page.

Figure 4A:
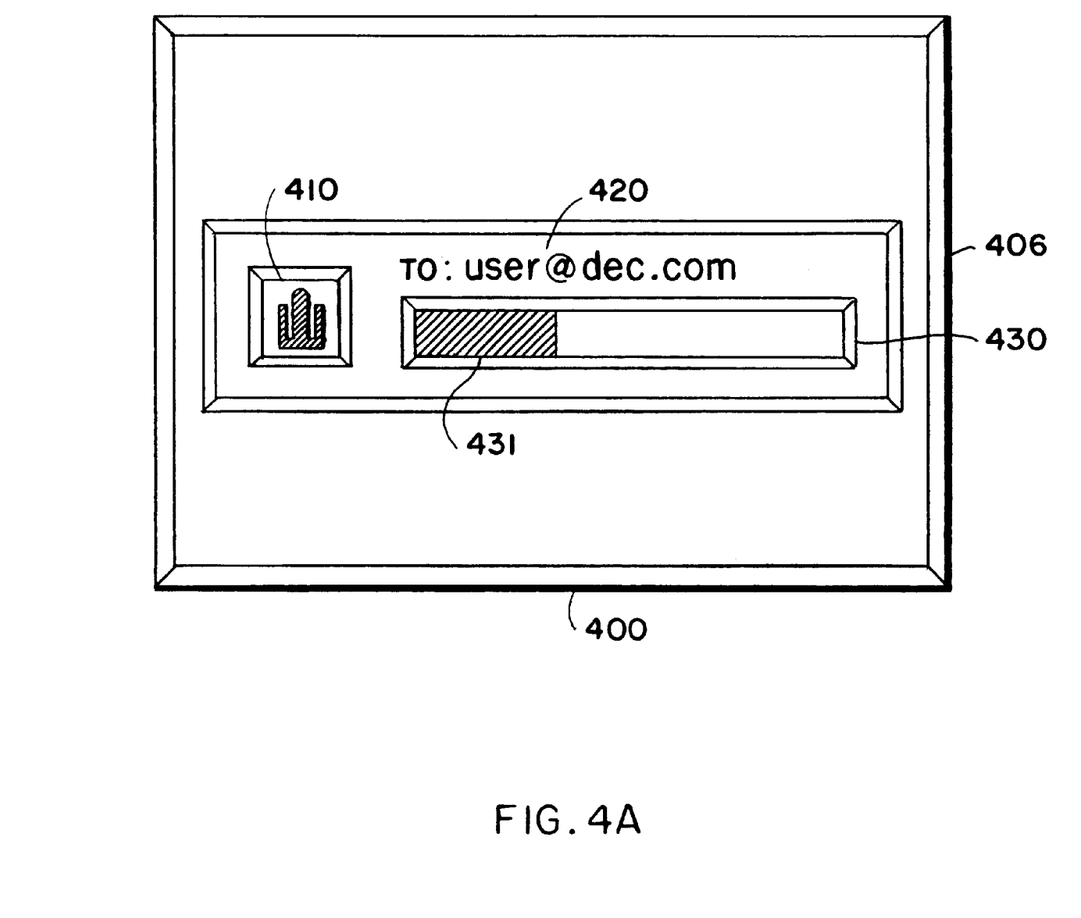
FIGS. 4A–4B are diagrams of a graphic user interfaces used by the browser extension program.
Figure 4B:
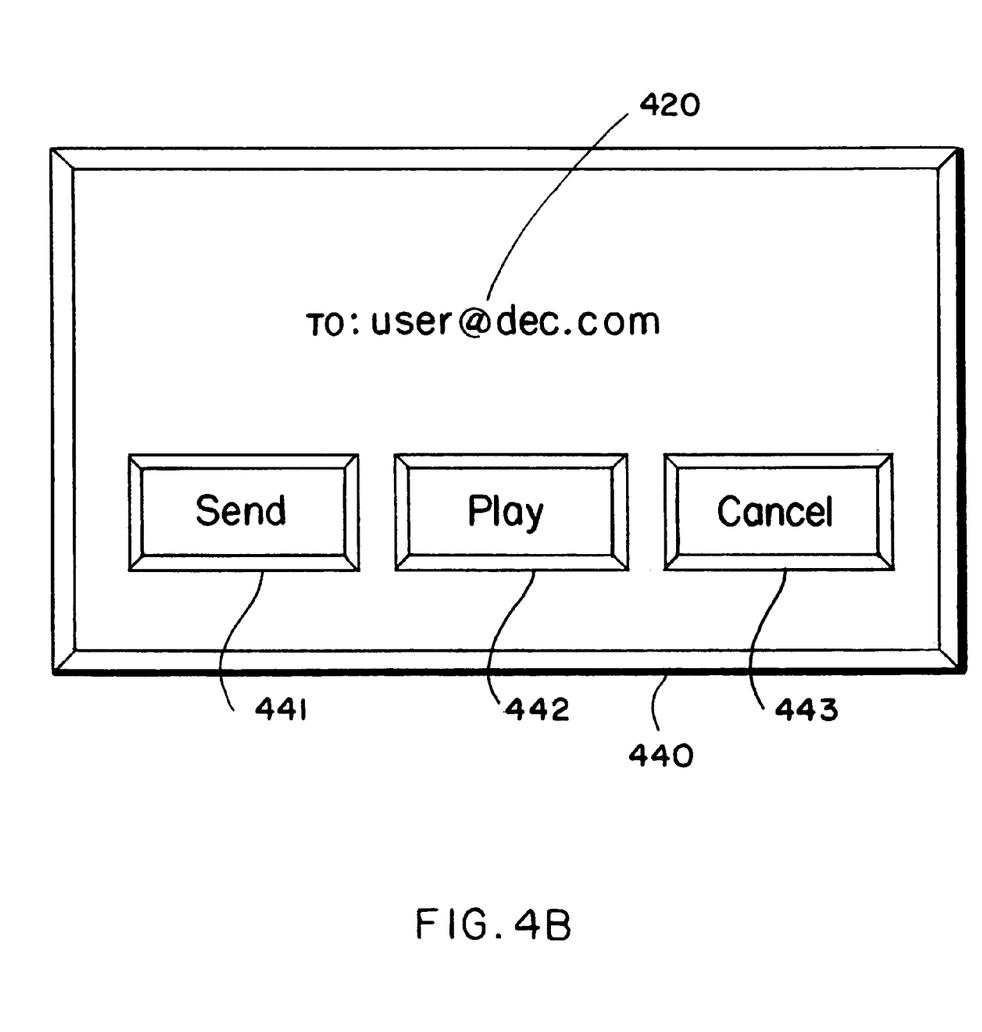

The operation of the message extension is now described with reference to FIGS. 4A–4B, and a process 500 of FIG. 5. FIGS. 4A, 4B show graphic user interfaces (GUI) which will be displayed in the window specified in field 222 of the tag 210. The GUI 400 includes a record button 410 depicting a microphone icon, and a default "To:" field 420, e.g., as specified in field 223 of tag 210, and a volume field 430.

Figure 5:
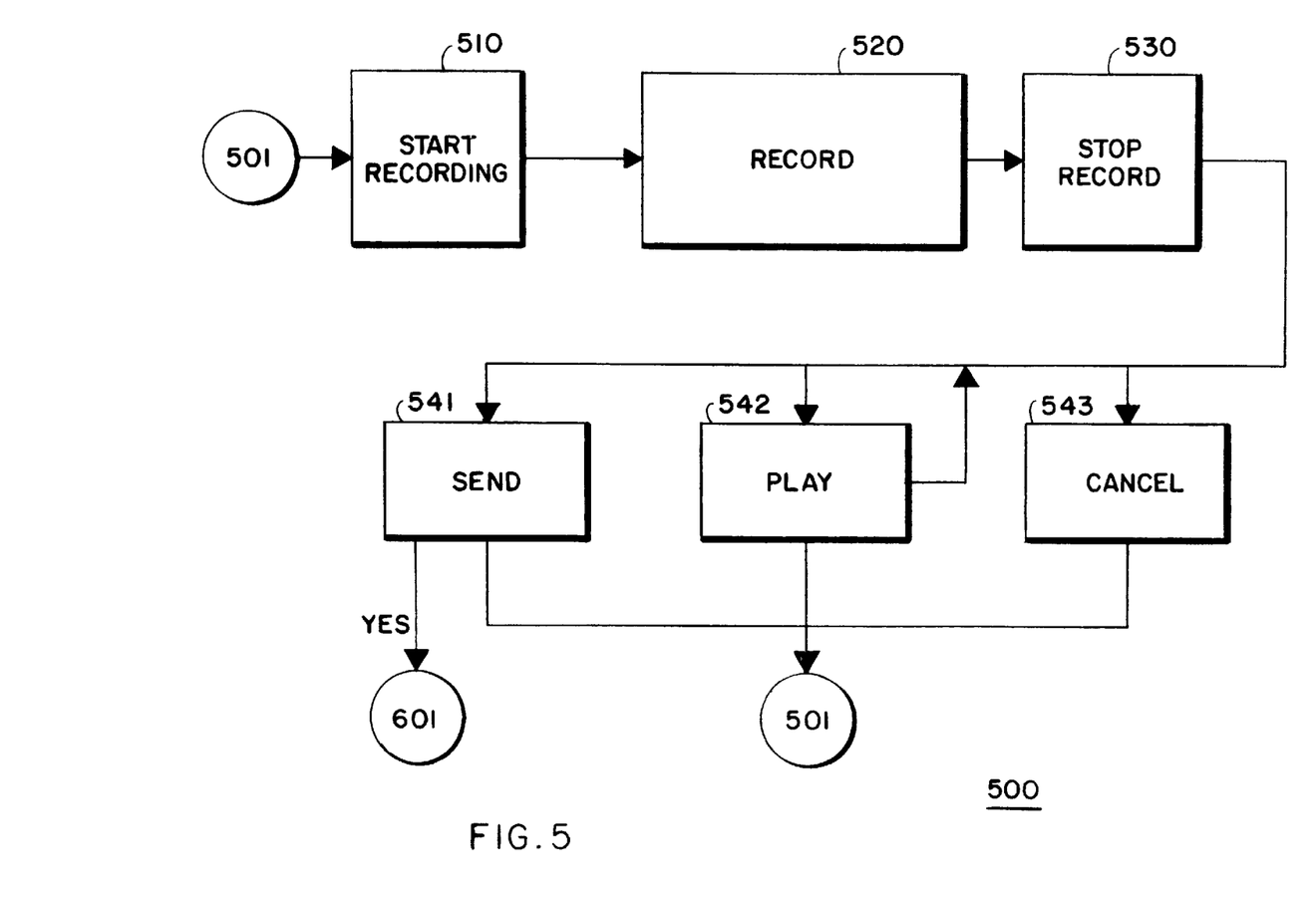
FIG. 5 is a flow diagram of a process for recording an audio message.

The user of the browser 101 "clicks" on the record button 410 to activate recording, step 510 of FIG. 5. The relative volume is indicated by a sliding bar 431 during the recording step 520. The signal is processed by the soundboard 117, and the digital signal is stored as a temporary file 113 on the disk 112 of the client computer 110.

Clicking on the record button 410 again stops recording, at step 530. At this point the GUI 440 of FIG. 4B is displayed in the extension window. The GUI 440 includes Send, Play, and Cancel buttons 441–443, as well as the default "To:" field 420.

Clicking on the Send button 441 transmits the temporary file 113 to the address(es) indicated in the field 420 as a MIME encoded file using the Internet "smtp" protocol. Sending the file 113 involves the sub-steps of a process 600 of FIG. 6. The file 113 is read from the disk 119, at step 610. The file is encoded using, for example, a Base64 Content-transfer-Encoding, see RFC 1521, N. Bernstein, N. Freed, *MIME (Multipurpose Internet Mail Extension) Part one:*

Figure 6:
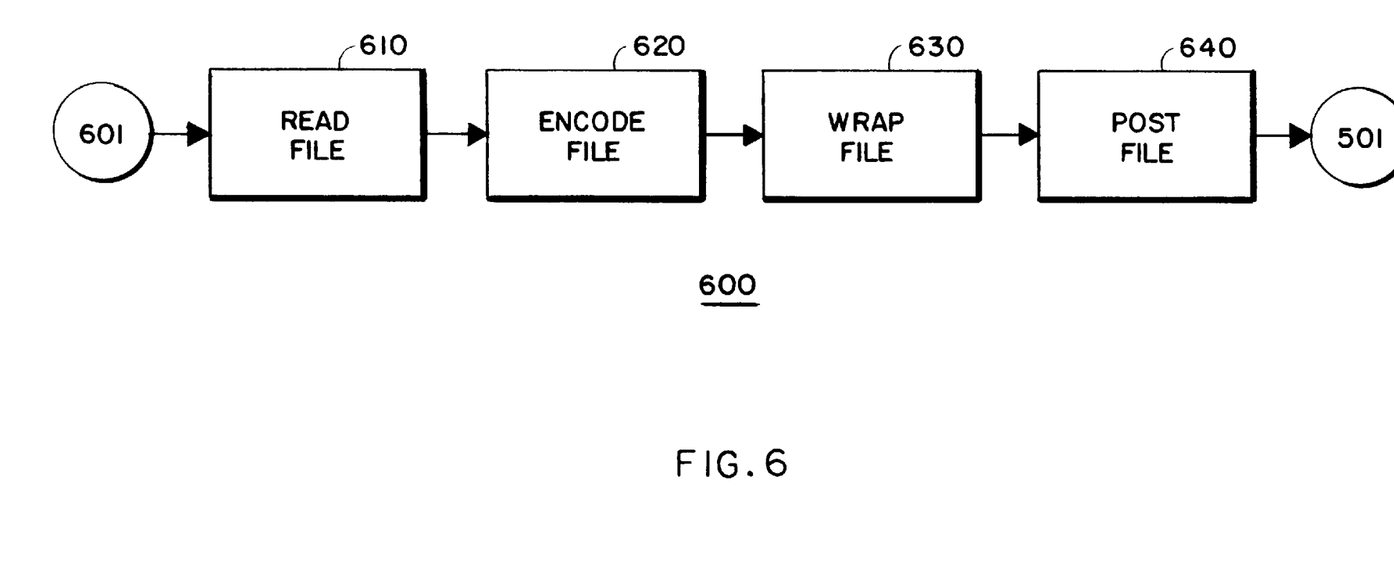
FIG. 6 is flow diagram of a process to send a file including the message.

*Mechanism for Specifying and describing the format of Internet Message Bodies*, Sep. 23, 1993, at step 620. The encoded file is wrapped with a mail header which includes the address information, and a MIME type indicator, e.g., "audio/x-wav," at step 630. Lastly, the wrapped file is posted with the command "mailto:<recipient(s)>," at step 640, where recipient(s) are the addressees.

Pressing the Play button 442 plays back the recorded message from the temporary file 113, at step 542. The GUI 440 does not change state during play-back. Clicking on the cancel button 443, at step 543, deletes the temporary file 113, and overlays the GUI 400 in the window.

Figure 7:
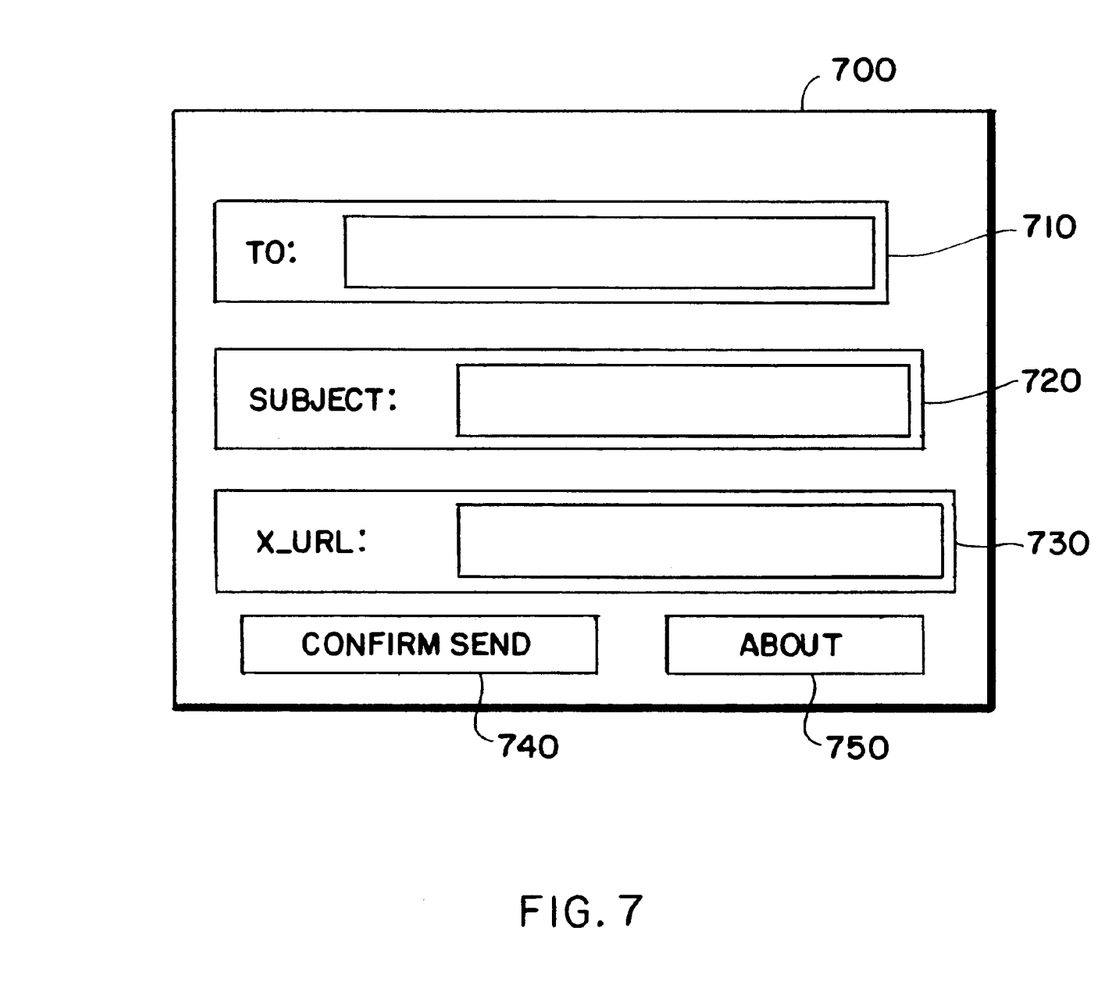
FIG. 7 is a diagram of a graphic user interface of a context menu.

Clicking the "right" button of the mouse at any time, shows the context menu GUI 700 of FIG. 7. The To: field 710 can be used to change the default recipient(s) who are to receive the message. A Subject field 720 can be used to enter a default "subject" header associated with the message. A field 730, is the default X-URL field of the message, for example "http://www.dec.com/~user/home.html."

A confirm send button 740 can be used to toggle automatic sending or not. If confirmation is disabled, then the message is sent as soon as recording has been stopped. The message is sent using the current default values as they would be displayed in the context menu 700. If confirmation is enabled, and this is the normal state, the message must be sent by clicking on the Send button 441. The About button 750 displays administrative information about the extension, such as date, version number, and the like.

As an advantage, the sender of the message, e.g., the user of the client computer 110 does not need any special software other than a standard Web browser. All message preparation and processing takes place within the application environment of the browser. To enable messaging, the sender only needs to locate, using the browser, any Web page that is enabled with a extension tag as described herein. This can be the page 200 created by the user of the client 120, or any other user, including the user of the client 10 or the client 130.

The recipient of the message, e.g., the user of the client 130, or any other user having a computer connected to the Internet, does not need any additional software other than a standard MIME enabled e-mail application. The choice of hardware and operating system is entirely independent of message extension as described herein.

Although the invention has been described with respect to audio messaging, it should be understood that the message can also be configured to communicate using other multimedia modalities. For example, the microphone 116 and soundcard 117 can be replaced by a video camera and video card. In this case, the extensions type can be "image" and the message encoded in the temporary file 113 has the corresponding MIME type. Images will be recorded and encoded when clicking on the record button 410 of FIG. 4, perhaps showing a camera icon. The recipient of the message will need a computer equipped with a video card to display the "image" MIME file.

It should also be understood, that a client computer equipped with both audio and image devices can simultaneously record sound and image data if both "audio" and "image" extensions are executed by the browser. In this case, the recipients of messages will receive messages having both sound and image signals. Furthermore, browser extensions can also be configured to perform text messaging, or still picture messaging, e.g., graphics. In the first case, clicking on the record button 410 permits the entry of a text message with the extension. The message in this case is simply sent as a "text" MIME type.

The principles of the invention have been described with respect to specific embodiments. It will be apparent to those skilled in the art that various modifications can be made to the embodiments shown. Therefore, the spirit and scope of the invention are set out in the appended claims.

We claim:

1. A computerized method for sending multimedia messages, comprising:

adding a tag specifying an extension program to a page accessible by a server computer;

requesting the page by a browser application executing in a first client computer connected to the server computer by a communications network;

retrieving the extension program via the server computer;

executing at the first client computer the extension program using the browser application program executing in the first client computer, execution of the extension program using the browser application program permitting creation of a multimedia message using a multimedia message user-input device at the first client computer, the multimedia message including at least one of audio and video information; and permitting the message to be accessed by a second client computer.

2. The method of claim 1 wherein:

the message includes an audio message recorded by a user of the first client computer using a microphone and a sound card comprised in the input device.

3. The method of claim 1 wherein:

the message includes a video message recorded by a user of the first client computer using a camera and a video card comprised in the input device.

4. The method of claim 1 wherein:

the message includes a still image message recorded by a user of the first client computer using a camera and a frame grabber card comprised in the input device.

5. The method of claim 1 further comprising:

specifying in the embedded tag a MIME type, a recipient address, and a location of the extension program.

6. The method of claim 1 wherein the extension program is a browser plug-in, and the method further comprises:

retrieving a dynamic link library corresponding to the extension program from a location in the computer network in response to the browser processing the page.

7. The method of claim 1 wherein the extension program is a browser applet, and the method further comprises:

retrieving an applet corresponding to the extension program from a location in the computer network in response to the browser processing the page.

8. An apparatus for sending electronic messages, comprising:

a server computer having access to a page including an embedded tag specifying an extension program;

a first client computer, connected to the server computer by a communications network, requesting the page using a browser application program;

a mechanism for retrieving the extension program specified in the tag;

the first client computer being configured to execute the extension program using the browser application program, execution of the extension program using the browser application program permitting creation, using a multimedia message user-input device at the first client computer, of a multimedia message, the multimedia message including at least one of audio and video information; and a second client computer that accesses the multimedia message.

9. The apparatus of claim 8 wherein:

the input device comprises a microphone and a sound card for permitting a user to input an audio message comprised in the multimedia message.

10. The apparatus of claim 8 wherein:

the input device comprises a camera and a vide card for permitting a user to input a video message comprised in the multimedia message.

11. The apparatus of claim 8 wherein:

the input device comprises a camera and a frame grabber card for permitting a user to input a still image message comprised in the multimedia message.

12. The apparatus of claim 8 wherein:

the embedded tag specifies a MIME type, a recipient address, and a location of the extension program.

13. The apparatus of claim 8 wherein:

the extension program is a browser plug-in, and the apparatus further comprises:

a dynamic link library corresponding to the extension program for being retrieved from a location in the computer network in response to the browser processing the page.

14. The apparatus of claim 8 wherein the extension program is a browser applet, and the apparatus further comprises:

an applet corresponding to the extension program for being retrieved from a location in the computer network in response to the browser processing the page.

15. The method of claim 1 wherein:

the first client computer is configured to store the message in a file at the first client computer.

16. The apparatus of claim 8 wherein:

the first client computer is configured to process the message for transmission to the second client computer.

17. The apparatus of claim 8 wherein:

the first client computer is configured to process the message for transmission to the second client computer in an electronic mail message.

18. The method of claim 1 wherein:

the message is stored at the first client computer.

19. The method of claim 1 wherein:

the message is sent from the first client computer to the second client computer.

20. The method of claim 1 wherein the message is sent from the first client computer to the second client computer as part of an electronic mail message.

21. A computerized method for sending multimedia messages, comprising:

inserting a tag specifying an extension program into a page accessible by a server computer;

requesting the page by a browser application executing in a first client computer connected to the server computer by a communications network; and executing at the first client computer the extension program using the browser application program executing in the first client computer, execution of the extension program using the browser application program permitting creation of a multimedia message using a multimedia message user-input device at the first client computer, the multimedia message including at least one of audio and video information.

* * * * *